United States Patent
Cochran et al.

(10) Patent No.: US 8,091,430 B1
(45) Date of Patent: Jan. 10, 2012

(54) PROTECTION SYSTEM FOR DIAPHRAGM OF MEMS DEVICE

(75) Inventors: Kevin Cochran, Falls Church, VA (US); Michael Deeds, Port Tobacco, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 16 days.

(21) Appl. No.: 12/924,027

(22) Filed: Sep. 14, 2010

(51) Int. Cl.
*G01L 7/00* (2006.01)

(52) U.S. Cl. .......................................... 73/706

(58) Field of Classification Search .................. None
See application file for complete search history.

(56) References Cited

U.S. PATENT DOCUMENTS

| | | | |
|---|---|---|---|
| 4,686,764 A * | 8/1987 | Adams et al. | 29/592.1 |
| 5,085,223 A * | 2/1992 | Lars et al. | 600/488 |
| 6,962,514 B2 | 11/2005 | Gross et al. | |
| 7,162,926 B1 | 1/2007 | Guziak et al. | |
| 7,194,901 B2 | 3/2007 | Silverbrook et al. | |
| 7,508,040 B2 | 3/2009 | Nikkel et al. | |
| 7,514,285 B2 | 4/2009 | Brown et al. | |
| 7,647,835 B2 | 1/2010 | Speldrich | |
| 2004/0075073 A1* | 4/2004 | Claydon et al. | 251/331 |
| 2005/0132826 A1* | 6/2005 | Teugels | 73/866.5 |
| 2006/0078753 A1* | 4/2006 | Bomberg et al. | 428/479.3 |
| 2007/0014689 A1* | 1/2007 | Teugels | 422/58 |
| 2009/0071904 A1* | 3/2009 | Degarie et al. | 210/650 |
| 2010/0209805 A1* | 8/2010 | Gupta et al. | 429/483 |

* cited by examiner

*Primary Examiner* — Andre Allen

(57) ABSTRACT

A system for protecting a diaphragm of a microelectromechanical systems (MEMS) device includes a housing coupled to the MEMS device such that its sensing diaphragm is surrounded thereby. A perforated barrier in the housing is adjacent to the sensing diaphragm. A protection diaphragm in the housing has its first side exposed to an external environment of interest, and has its second side facing the perforated barrier and spaced apart therefrom. A fluid is disposed contiguously between the second side of the protection diaphragm and the sensing diaphragm.

12 Claims, 1 Drawing Sheet

US 8,091,430 B1

PROTECTION SYSTEM FOR DIAPHRAGM OF MEMS DEVICE

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to microelectromechanical systems (MEMS) devices, and more particularly to a system that protects the diaphragm of a MEMS device from over pressurization.

BACKGROUND OF THE INVENTION

Microelectromechanical systems (MEMS) are miniaturized devices (i.e., micron to millimeter dimensions) that can be configured as actuators, sensors, and other mechanical structures. Many of these devices need to interact with outside stimuli such as temperature, flow, acceleration or pressure, and may be further designed to respond only when the particular stimulus is within a specific range. It is not uncommon for this range to be exceeded during the lifetime of the MEMS device. When the MEMS device uses a flexible diaphragm to detect changes in an outside pressure stimulus and the operational range of the sensing diaphragm is exceeded, the MEMS device may be irreparably damaged.

SUMMARY OF THE INVENTION

Accordingly, it is an object of the present invention to provide a system that protects a MEMS device's diaphragm from excessive loading.

Another object of the present invention is to provide a system that limits the pressure that acts on a MEMS device's diaphragm to a specified maximum pressure.

Other objects and advantages of the present invention will become more obvious hereinafter in the specification and drawings.

In accordance with the present invention, a system for protecting a diaphragm of a MEMS device is provided. A housing is fixedly coupled to a MEMS device where the sensing diaphragm of the MEMS device is surrounded by the housing. A perforated barrier is fitted in the housing and is adjacent to the sensing diaphragm. A protection diaphragm is also fitted in the housing. More specifically, a first side of the protection diaphragm is exposed to an external environment of interest, while a second side of the protection diaphragm faces the perforated barrier and is spaced apart therefrom. A fluid is disposed contiguously between the second side of the protection diaphragm and the sensing diaphragm.

BRIEF DESCRIPTION OF THE DRAWINGS

Other objects, features and advantages of the present invention will become apparent upon reference to the following description of the exemplary embodiments and to the drawings, wherein corresponding reference characters indicate corresponding parts throughout the several views of the drawings and wherein.

DETAILED DESCRIPTION OF THE INVENTION

Figure 1:
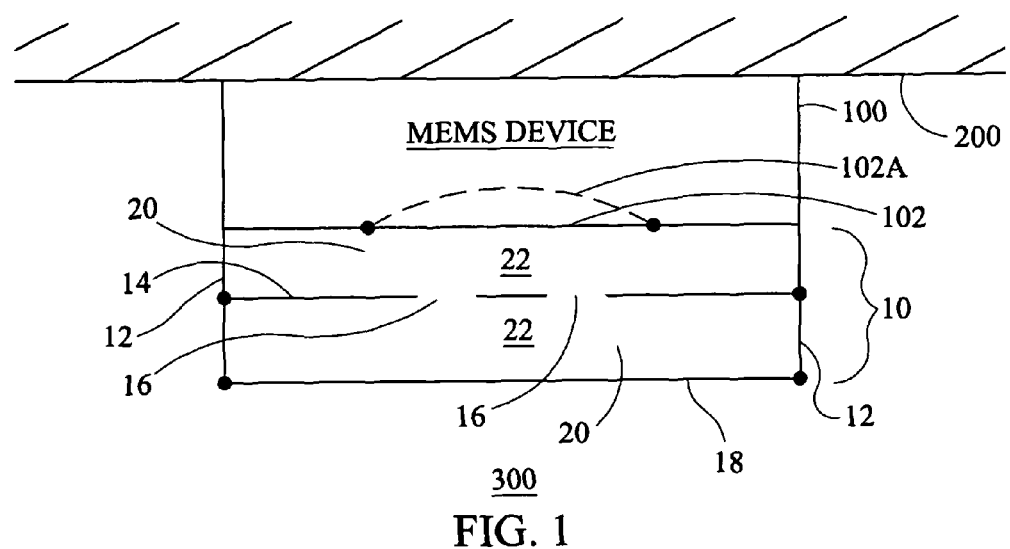
FIG. 1 is a schematic view of a system for protecting a MEMS device's diaphragm in accordance with the present invention.

Referring now to the drawings and more particularly to FIG. 1, a system for protecting the diaphragm 102 of a MEMS device 100 is shown and is referenced generally by numeral 10. In general, MEMS device 100 is mounted on a support 200 (e.g., a printed circuit board) and has an exposed diaphragm 102 designed to flex up to a position indicated by defined lines 102A. Such flexing of diaphragm 102 is generally brought about by some changing condition in an environment of interest that ultimately causes a pressure change acting on diaphragm 102. The particular condition and/or environment are not limitations of the present invention. Accordingly, the particular construction of MEMS device 100 and its intended application are not limitations of the present invention. It is sufficient to say that if the condition changes by an amount that exceeds the designed operating range of diaphragm 102 (illustrated by dashed line 102A), the effectiveness of MEMS device 100 may be jeopardized.

System 10 provides protection for MEMS device 100 as it protects diaphragm 102 from being over pressurized, i.e., flexed beyond its designed maximum allowed deflection limit defined by dashed line 102A. To do this, system 10 includes an external housing 12 that is generally mounted to MEMS device 100, support 200, and/or some other type of support (not shown) such that diaphragm 102 is surrounded and enclosed by housing 12. Mounted in housing 12 and spaced apart from diaphragm 102 is a barrier 14 having one or more holes 16 therethrough. Generally, barrier 14 is rigid for reasons that will become evident later herein.

A flexible diaphragm 18 is mounted in housing 12 and is adjacent to barrier 14 (e.g., abutting, spaced apart from barrier 14 as illustrated, etc.) such that a volume 20 is defined in housing 12 between one side of diaphragm 18 and one side of diaphragm 102. Volume 20 is contiguous between diaphragms 18 and 102 owing to holes 16 in barrier 14. That is, volume 20 includes the volume defined by holes 16. Contiguous volume 20 is filled with a fluid 22 (e.g., a gas, an incompressible fluid, or any fluid medium that can flow through holes 16). The other side of diaphragm 18 is exposed to an external environment 300 that is subject to a changing condition for which MEMS device 100 is designed to sense.

In operation, when a changing condition in environment 300 causes diaphragm 18 to flex into volume 20, fluid 22 is pushed through holes 16 towards diaphragm 102 thereby causing a corresponding flex in diaphragm 102. Barrier 14 is placed such that diaphragm 18 is limited to flexing (under the force of the environmental condition) by an amount that corresponds with the maximum allowed deflection limit 102A. Thus, system 10 forms an in-line protection system for diaphragm 102.

Figure 2:
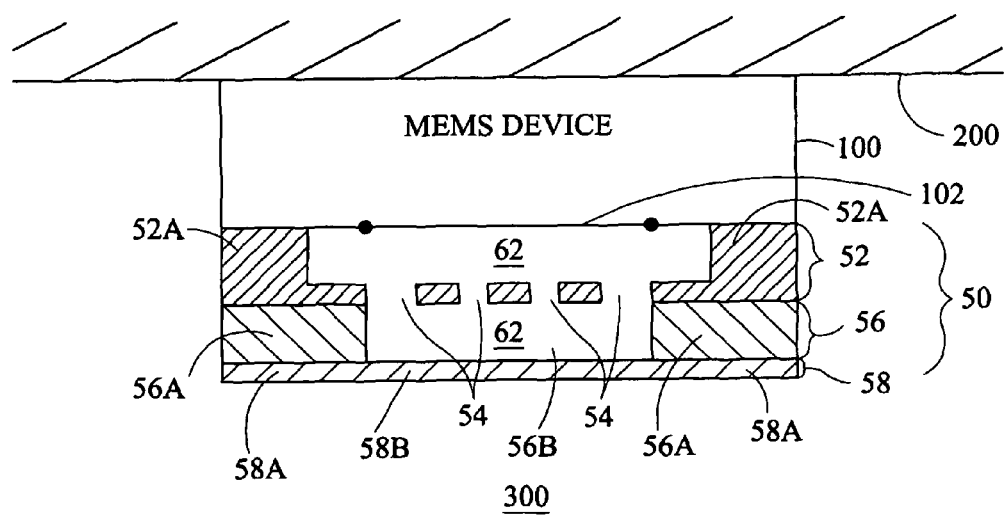
FIG. 2 is a cross-sectional view of a microchip embodiment of the system of the present invention.

Since MEMS device 100 is generally fabricated using microchip technology, an embodiment of the present invention could be fabricated using the same technology. For example, FIG. 2 illustrates a microchip realization of the present invention where the microchip is referenced generally by numeral 50. In the illustrated embodiment, microchip 50 is defined by three layers that may be fabricated and installed on MEMS device 100, or could be fabricated sequentially directly on MEMS device 100. Still further, microchip 50 could be fabricated as part of MEMS device 100 without departing from the scope of the present invention.

Microchip 50 includes a barrier layer 52 having an outer perimeter 52A that is coupled and sealed to MEMS device 100 and that surrounds/encloses diaphragm 102. Barrier layer 52 is generally rigid with multiple perforations 54 formed therethrough.

A volume defining layer 56 is coupled/sealed to barrier layer 52.

More specifically, volume defining layer 56 has a solid annular perimeter 56A that is coupled/sealed to outer perimeter 52A. Solid annular perimeter 56A encloses a volume 56B that extends contiguously through perforations 54 and up to diaphragm 102. A diaphragm layer 58 is coupled/sealed to volume defining layer 56.

That is, a rigid annular perimeter 58A is coupled/sealed to solid annular perimeter 56A, and a flexible diaphragm 58B is coupled to perimeter 58A. One side of diaphragm 58B faces volume 56B while the other side of diaphragm 58B is exposed to external environment 300. Similar to system 10, microchip 50 has a fluid 62 contiguously filling volume 56B. Operation of the microchip 50 is essentially the same as described above for system 10.

The advantages of the present invention are numerous. The in-line protection system for a MEMS device's diaphragm may be added to existing MEMS devices or incorporated into MEMS devices as they are being batch fabricated. The protection system may use the same fabrication technology and scale used for current MEMS devices.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed as new and desired to be secured by Letters Patent of the United States is:

1. A system for protecting a diaphragm of a microelectromechanical systems (MEMS) device, comprising:
   a housing being adapted for fixedly coupling to the MEMS device wherein the diaphragm is a sensing diaphragm surrounded by said housing;
   a perforated barrier being fitted in said housing and being situated adjacent to the sensing diaphragm;
   a protection diaphragm being fitted in said housing,
      wherein said protection diaphragm comprises a first side and a second side,
      wherein said first side is exposed to an external environment of interest, and
      wherein said second side faces said perforated barrier and is spaced apart therefrom; and
   a fluid being disposed contiguously between said second side of said protection diaphragm and the sensing diaphragm.

2. A system as in claim 1, wherein said housing is fabricated in accordance with microchip technology.

3. A system as in claim 1, wherein said perforated barrier is rigid.

4. A system as in claim 1, wherein said fluid is a gaseous fluid.

5. A system as in claim 1, wherein said fluid is an incompressible fluid.

6. A system for protecting a diaphragm of a microelectromechanical systems (MEMS) device, comprising:
   a microchip being adapted for fixedly coupling to a MEMS device,
      wherein the diaphragm thereof is surrounded, wherein the diaphragm is a sensing diaphragm,
   wherein said microchip defined by layers that, in succession relative to the sensing diaphragm, includes a first layer, a second layer, a third layer and a fluid,
   wherein said first layer comprises a barrier with at least one perforation formed therethrough, said barrier spaced apart from the sensing diaphragm by a region,
   wherein said second layer defines a volume in fluid communication with said barrier,
   wherein said third layer comprises a protection diaphragm to seal off one side of said volume,
   wherein flexural travel of said protection diaphragm is limited by said barrier, and
   wherein said fluid is disposed contiguously in said volume, in said at least one perforation, and in said region.

7. A system as in claim 6, wherein said barrier is a rigid barrier.

8. A system as in claim 6, wherein said fluid is a gaseous fluid.

9. A system as in claim 6, wherein said fluid is an incompressible fluid.

10. A system for protecting a diaphragm of a microelectromechanical systems (MEMS) device, comprising:
    a microchip being adapted for fixedly coupling to the MEMS device, wherein the diaphragm is a sensing diaphragm, said sensing diaphragm thereof is surrounded,
    wherein said microchip defined by layers that, in succession relative to the sensing diaphragm, includes a first layer, a second layer, a third layer and a fluid,
    wherein said first layer comprises a rigid barrier, which includes a plurality of perforations formed therethrough, said rigid barrier is spaced apart from the sensing diaphragm by a region,
    wherein said second layer includes a volume in fluid communication with said barrier,
    wherein said third layer comprises a protection diaphragm to seal off one side of said volume, said protection diaphragm includes a first side and a second side with said first side exposed to said volume and said second side exposed to an external environment of interest,
    wherein flexural travel of said protection diaphragm into said volume is limited by said barrier to thereby prohibit over pressurization of the sensing diaphragm, and
    wherein said fluid is disposed contiguously in said volume, in said at least one perforation, and in said region.

11. A system as in claim 10, wherein said fluid is a gaseous fluid.

12. A system as in claim 10, wherein said fluid is an incompressible fluid.

* * * * *